US011321595B2

(12) United States Patent
Maeshima et al.

(10) Patent No.: US 11,321,595 B2
(45) Date of Patent: May 3, 2022

(54) MEDIA PROCESSING APPARATUS CAPABLE OF PRINTING LABEL ON STORAGE MEDIA WITHOUT INTERRUPTING

(71) Applicant: SEIKO EPSON CORPORATION, Tokyo (JP)

(72) Inventors: Hidetoshi Maeshima, Shiojiri (JP); Sadaaki Horiuchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/101,228

(22) Filed: Nov. 23, 2020

(65) Prior Publication Data
US 2021/0158110 A1  May 27, 2021

(30) Foreign Application Priority Data
Nov. 25, 2019 (JP) .............................. JP2019-212390

(51) Int. Cl.
  *G06K 15/02* (2006.01)
  *G11B 20/10* (2006.01)
  *G11B 7/0037* (2006.01)
(52) U.S. Cl.
  CPC ............ *G06K 15/024* (2013.01); *G11B 20/10* (2013.01); *G11B 7/0037* (2013.01); *G11B 2020/10861* (2013.01)
(58) Field of Classification Search
  None
  See application file for complete search history.

(56) References Cited

U.S. PATENT DOCUMENTS

| 6,400,659 | B1 * | 6/2002 | Kitaoka | G11B 7/26 369/34.01 |
| 6,546,475 | B1 | 4/2003 | Haseno | |
| 7,843,785 | B2 * | 11/2010 | Nishioka | G11B 23/40 369/53.2 |
| 7,882,272 | B2 * | 2/2011 | Ichikawa | G11B 17/20 710/5 |

(Continued)

FOREIGN PATENT DOCUMENTS

| CN | 101504858 | 8/2009 |
| JP | 2012-190511 A | 10/2012 |

*Primary Examiner* — Tan X Dinh
(74) *Attorney, Agent, or Firm* — Workman Nydegger

(57) ABSTRACT

A media processing apparatus includes a medium drive, a label printer, and a medium-processing-apparatus control section. When the medium-processing-apparatus control section receives a first photographic data file, the medium-processing-apparatus control section causes the medium drive to write the first photographic data file to a medium. After the medium-processing-apparatus control section has received the first photographic data file, the medium-processing-apparatus control section receives a second photographic data file and causes the medium drive to write the second photographic data file to the medium. When the medium-processing-apparatus control section receives a medium close command from a control apparatus, the medium-processing-apparatus control section terminates write processing by the medium drive in response to the received medium close command, and causes the label printer to perform printing.

20 Claims, 5 Drawing Sheets

(56) References Cited

U.S. PATENT DOCUMENTS

| | | | | |
|---|---|---|---|---|
| 7,961,563 B2* | 6/2011 | Nishioka | ............... | B41J 3/4071 |
| | | | | 369/30.32 |
| 7,974,165 B2* | 7/2011 | Maeshima | ............. | G11B 17/08 |
| | | | | 369/53.2 |
| 2008/0123482 A1* | 5/2008 | Otsuka | .................... | B41J 29/38 |
| | | | | 369/47.1 |
| 2008/0170480 A1* | 7/2008 | Ikemoto | ............... | G11B 7/0045 |
| | | | | 369/47.1 |
| 2009/0195804 A1 | 8/2009 | Kojima | | |
| 2010/0125861 A1* | 5/2010 | Inoue | .................... | G11B 17/10 |
| | | | | 720/601 |
| 2010/0125862 A1* | 5/2010 | Inoue | .................... | G11B 17/10 |
| | | | | 720/614 |
| 2010/0125863 A1* | 5/2010 | Inoue | .................... | G11B 17/10 |
| | | | | 720/704 |
| 2010/0214889 A1* | 8/2010 | Maeshima | ............. | G11B 23/40 |
| | | | | 369/47.14 |
| 2012/0229854 A1 | 9/2012 | Maeshima et al. | | |
| 2020/0338904 A1* | 10/2020 | Maeshima | ........... | B41J 2/04501 |
| 2020/0364522 A1* | 11/2020 | Maeshima | ............... | H04N 7/18 |

* cited by examiner

MEDIA PROCESSING APPARATUS CAPABLE OF PRINTING LABEL ON STORAGE MEDIA WITHOUT INTERRUPTING

The present application is based on, and claims priority from JP Application Serial Number 2019-212390, filed Nov. 25, 2019, the disclosure of which is hereby incorporated by reference herein in its entirety.

BACKGROUND

1. Technical Field

The present disclosure relates to a media processing apparatus, a method for controlling the media processing apparatus, and a non-transitory computer-readable storage medium storing a program.

2. Related Art

An apparatus known in related art writes data to a compact disc (CD), a digital versatile disc (DVD), a Blu-ray (registered trademark) disc (BD), or another type of medium, and then performs printing on the label surface of the medium. For example, JP-A-2012-190511 discloses a media processing apparatus that, when creating a medium, acquires print data and an image file from a control apparatus, writes the acquired image file to the medium, and then performs printing on the label surface based on the acquired print data.

The media processing apparatus in related art, as described in JP-A-2012-190511, is based on the premise that write data to be written to a medium is acquired from the control apparatus after all the write data is prepared. Therefore, in the case where the control apparatus intermittently sends pieces of write data, the media processing apparatus in related art cannot determine when the media processing apparatus performs printing on the label surface after having written which piece of write data. It is therefore difficult to create a medium.

SUMMARY

According to an aspect, a media processing apparatus is provided. The media processing apparatus can communicate with a control apparatus that sends first write data and second write data. The media processing apparatus includes: a data writing unit that writes the first write data and the second write data to a medium, the first write data and second write data being received from the control apparatus; a printing unit that performs printing on the label surface of the medium; and a control section that controls the data writing unit and the printing unit. Under control of the control section, the first write data is received from the control apparatus and the data writing unit writes the first write data to the medium; after the first write data is received, the second write data is received from the control apparatus and the data writing unit writes the second data to the medium; and when a medium close command that commands close processing on the medium is received from the control apparatus after the second write data is received, write processing by the data writing unit is terminated in response to the medium close command received and the printing unit performs printing on the label surface.

In the above media processing apparatus, the control section may calculate a free space in the medium, and when the control section decides, based on the calculated free space, that a space to which the second write data is written is insufficient in the medium, may send, to the control apparatus, information indicating that the space to which the second write data is written is insufficient in the medium.

In the above media processing apparatus, when, after the second write data is received from the control apparatus, third write data to be sent from the control apparatus or the medium close command is not yet received from the control apparatus within a predetermined time, the control section may send, to the control apparatus, information indicating that the third write data or the medium close command is not yet received.

In the above media processing apparatus, when, after the second write data is received from the control apparatus, third write data to be sent from the control apparatus or the medium close command is not yet received from the control apparatus within a predetermined time, the control section may terminate write processing by the data writing unit and may cause the printing unit to perform printing on the label surface.

In the above media processing apparatus, when a medium create command that commands media creation on the medium is received from the control apparatus, the control section may start the write processing by the data writing unit.

According to another aspect, a method for controlling a media processing apparatus that can communicate with a control apparatus is provided. The media processing apparatus includes: a data writing unit that writes first write data and second write data to a medium, the first write data and second write data being received from the control apparatus; and a printing unit that performs printing on a label surface of the medium. The method includes: receiving the first write data from the control apparatus and causing the data writing unit to write the first write data to the medium; receiving the second write data from the control apparatus after the first write data is received and causing the data writing unit to write the second data to the medium; and after the second write data is received, receiving, from the control apparatus, a medium close command that commands close processing on the medium, terminating write processing by the data writing unit in response to the received medium close command, and causing the printing unit to perform printing on the label surface.

In the above method for controlling a media processing apparatus, after the first write data is written, a free space in the medium may be calculated.

In the above method for controlling a media processing apparatus, after the second write data is received from the control apparatus, the free space and a data amount of the second write data are compared.

According to further another aspect, a non-transitory computer-readable storage medium storing a program is provided. The program is executed by a control section in a media processing apparatus that can communicate with a control apparatus. The media processing apparatus includes: a data writing unit that writes first write data and second write data to a medium, the first write data and second write data being received from the control apparatus, and a printing unit that performs printing on the label surface of the medium. Under control of the control section, the first write data is received from the control apparatus and the data writing unit is caused to write the first write data to the medium; the second write data is received from the control apparatus after the first write data is received and the data writing unit is caused to write the second data to the medium; and a medium close command that commands close processing on the medium is received from the control apparatus after the second write data is received, and write processing by the data writing unit is terminated in response to the received medium close command and the printing unit is caused to perform printing on the label surface.

DESCRIPTION OF EXEMPLARY EMBODIMENTS

Figure 1:
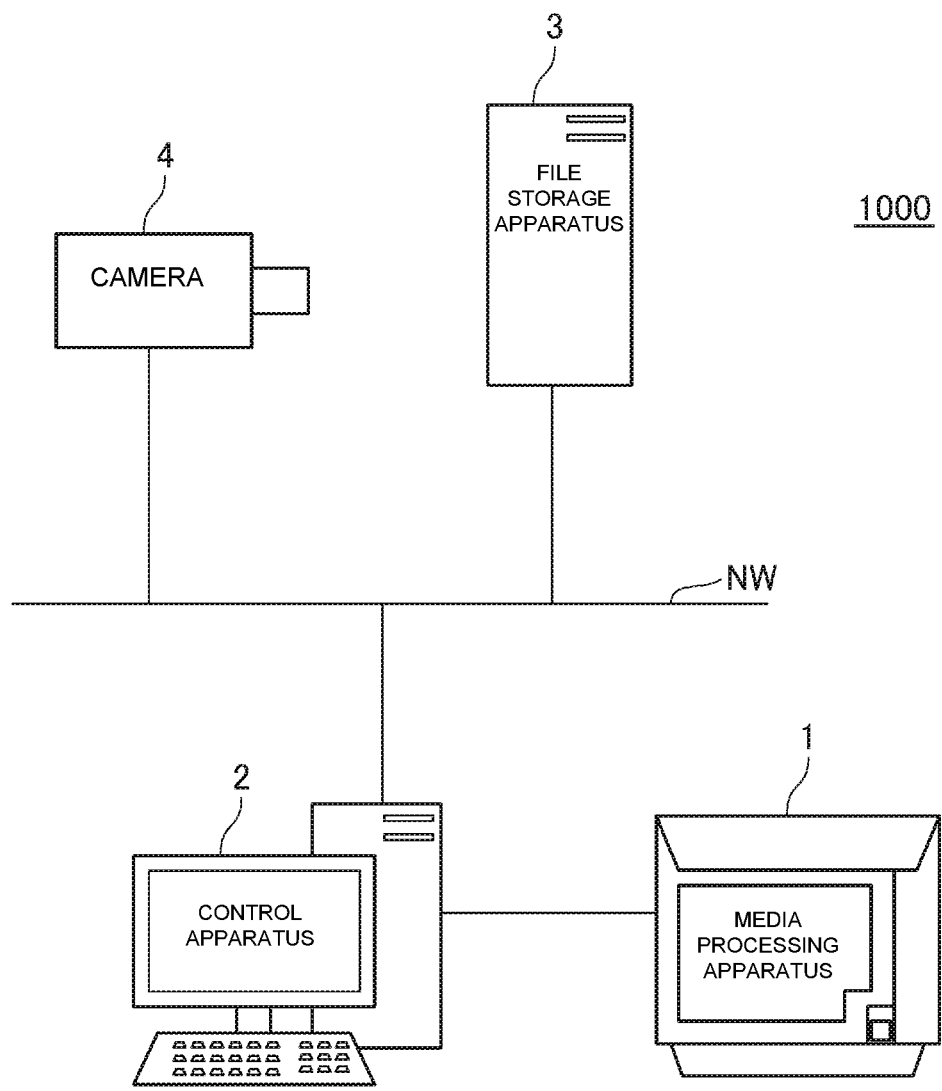
FIG. 1 illustrates the structure of a media processing system.

FIG. 1 illustrates the structure of a media processing system 1000.

The media processing system 1000 has a media processing apparatus 1 and a control apparatus 2 that controls the media processing apparatus 1.

The media processing apparatus 1 performs media creation on a medium M shaped like a circular plate, such as, for example, a CD, DVD, or BD; in media creation, data is written to the medium M and printing is performed on the label surface of the medium M so that data is written to the recording surface of the medium M and an image is printed on the label surface. The media processing apparatus 1 communicates with the control apparatus 2 in compliance with a communication standard such as, for example, a universal serial bus (USB) standard.

The control apparatus 2, which is a computer, causes the media processing apparatus 1 to perform media creation on the medium M so that data is written to the recording surface and an image is printed on the label surface. That is, the control apparatus 2 controls the media processing apparatus 1 to cause it to write data to the medium M and to perform printing on the label surface of the medium M. Although the control apparatus 2 illustrated in FIG. 1 is a desktop computer, the control apparatus 2 may be a laptop computer or tablet computer. The control apparatus 2 is connected to a network NW so that the control apparatus 2 acquires, from a file storage apparatus 3 connected to the network NW, a file to be written to the medium M.

The network NW may be structured with physical lines or with virtual lines such as in a virtual private network (VPN).

In the media processing system 1000 in FIG. 1, a single media processing apparatus 1 is coupled to a single control apparatus 2. However, a plurality of media processing apparatuses 1 may be coupled to a single control apparatus 2. Although the media processing system 1000 in FIG. 1 has a single control apparatus 2, the media processing system 1000 may have a plurality of control apparatuses 2.

The file storage apparatus 3 acquires photographic data from a camera 4 through the network NW and stores the acquired photographic data in a file format. Photographic data output from the camera 4 may be video data or may be still picture data. In the description below, photographic data in a file format will be referred to as a photographic data file.

The camera 4 acquires photographic data obtained by photography and outputs the acquired photographic data to the file storage apparatus 3 through the network NW. Specifically, during photography, the camera 4 intermittently outputs photographic data to the file storage apparatus 3 at intervals of a predetermined photography time or in units of a predetermined amount of data.

When, for example, the media processing system 1000 is applied to a court of law and the camera 4 is mounted in a courtroom, the camera 4 photographs the interior of the courtroom in which a judgment is in progress and outputs the resulting photographic data to the file storage apparatus 3. Here, it will be assumed that the judgment is performed in the courtroom for 45 minutes and the camera 4 outputs a piece of photographic data to the file storage apparatus 3 at 15-minute intervals, so the camera 4 intermittently outputs a total of three pieces of photographic data to the file storage apparatus 3 at 15-minute intervals, one in each 15 minutes.

Figure 2:
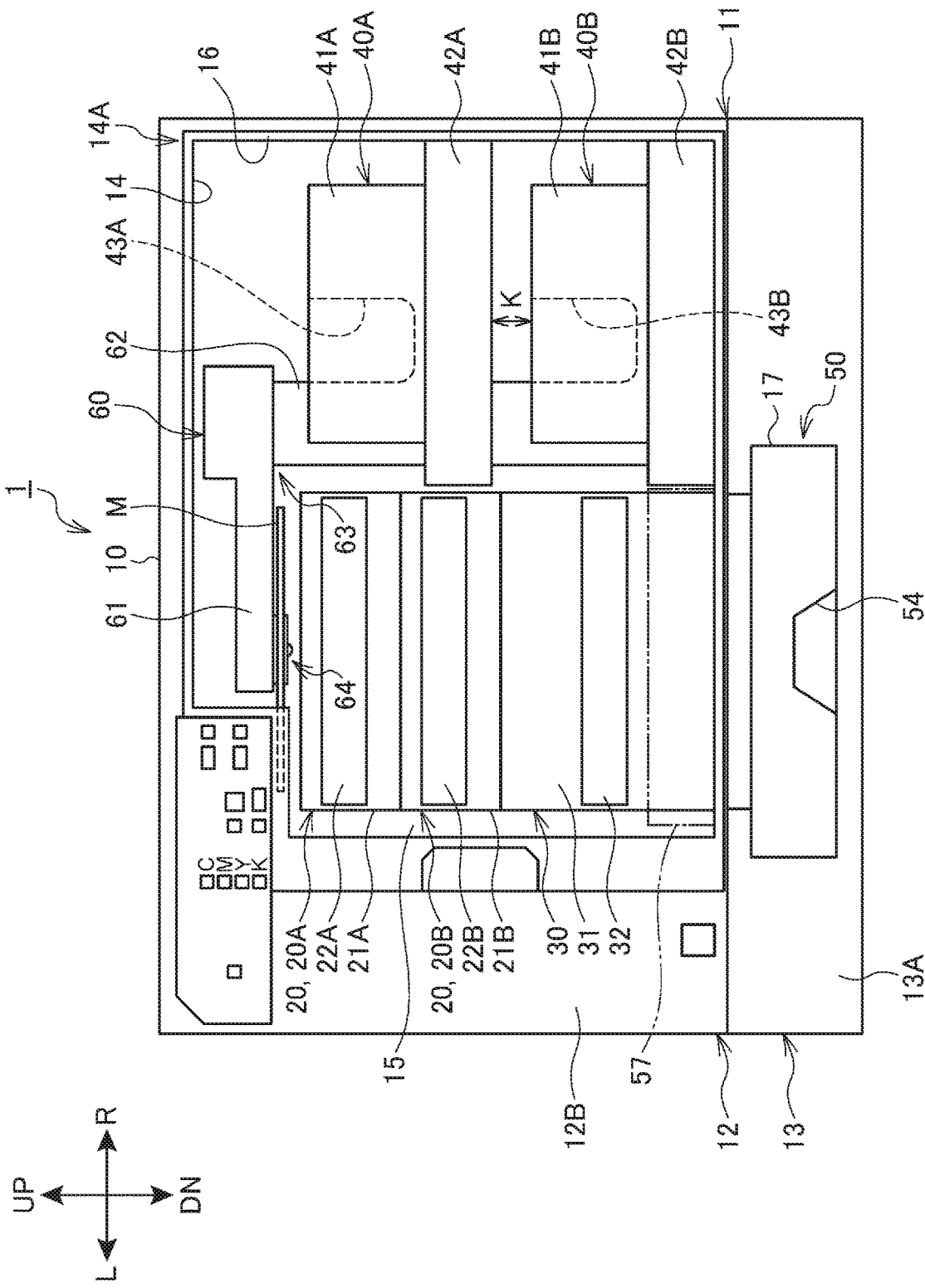
FIG. 2 is a front view illustrating the structure of a media processing apparatus.
Figure 3:
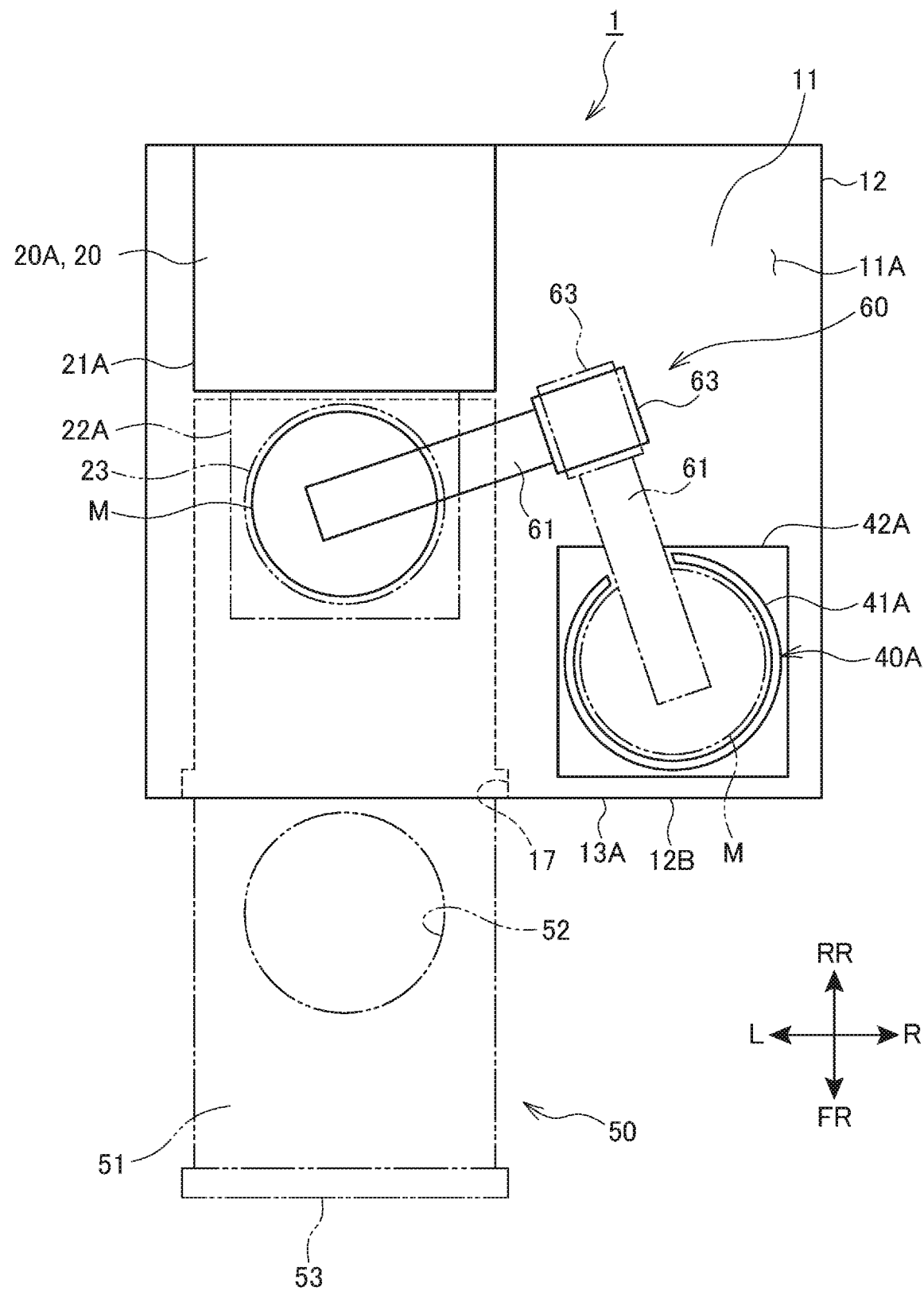
FIG. 3 is a plan view illustrating the interior of the case of the media processing apparatus when viewed from above.

FIG. 2 is a front view illustrating the structure of the media processing apparatus 1. FIG. 3 is a plan view illustrating the interior of the case 10 of the media processing apparatus 1 when viewed from above.

In FIGS. 2 and 3, the right side of the media processing apparatus 1 in a state in which the media processing apparatus 1 is mounted is indicated by the symbol R, the left side is indicated by the symbol L, the upper side is indicated by the symbol UP, the lower side is indicated by the symbol DN, the front is indicated by the symbol FR, and the rear is indicated by the symbol RR.

The interior of the case 10 of the media processing apparatus 1 is vertically separated by a partition 11 as illustrated in FIG. 2. In the description below, a portion, above the partition 11, of the case 10 will be referred to as the upper case denoted by reference numeral 12, and a portion, below the partition 11, of the case 10 will be referred to as the lower case denoted by reference numeral 13.

As illustrated in FIGS. 2 and 3, two medium drives 20, which are a first medium drive 20A and a second medium drive 20B, a label printer 30, a first stacker 40A, a second stacker 40B, and a transport section 60 are provided in the upper case 12. The first medium drive 20A and second medium drive 20B each are an example of a data writing unit. The label printer 30 is an example of a printing unit.

The first medium drive 20A is an apparatus that emits laser light to the recording surface of the medium M to write data. When the first medium drive 20A is intended for, for example, a CD, DVD, or BD, the recoding head of the first medium drive 20A emits laser light with a waveform corresponding to the type of the medium M. As illustrated in FIG. 3, the first medium drive 20A has a medium drive body 21A as well as a drive tray 22A movable in the front-rear direction so as to be inserted into and pulled out of the medium drive body 21A. A recess 23, which is substantially circular, is formed in the upper surface of the drive tray 22A, the medium M being mounted in the recess 23. The drive tray 22A can move in the front-rear direction between a processing position at which the first medium drive 20A writes data to the medium M and a transfer position at which the arm 61 of the transport section 60 passes and receives the medium M. In FIG. 3, the drive tray 22A is positioned at the receiving position with the medium M mounted in the recess 23.

The second medium drive 20B is also an apparatus that emits laser light to the recording surface of the medium M to write data as with the first medium drive 20A. The recording head of the second medium drive 20B emits laser light as with the first medium drive 20A. The second medium drive 20B has a medium drive body 21B as well as a drive tray 22B movable in the front-rear direction so as to be inserted into and pulled out of the medium drive body 21B. A recess, which is substantially circular, is formed in the upper surface of the drive tray 22B as with the drive tray 22A, the medium M being mounted in the recess. The drive tray 22B can move in the front-rear direction between a processing position at which the second medium drive 20B writes data to the medium M and a transfer position at which the arm 61 passes and receives the medium M.

The label printer 30 is a printing apparatus that prints an image on the label surface of the medium M. The label printer 30 has a carriage that reciprocates in the right and left direction, as well as a printing mechanism, such as an ink jet head, mounted in the carriage. The label printer 30 has a printer body 31 as well as a printer tray 32 provided so as to be inserted into and pulled out of the printer body 31. A recess, which is substantially circular, is formed in the upper surface of the printer tray 32 as with the drive trays 22A and 22B, the medium M being mounted in the recess. The printer tray 32 can move in the front-rear direction between a printing position at which the label printer 30 prints an image on the label surface of the medium M and a transfer position at which the arm 61 passes and receives the medium M.

As illustrated in FIG. 2, the first stacker 40A and second stacker 40B are provided in the upper case 12 as storage sections in which the medium M is stored.

The first stacker 40A has a first-stacker storage section 41A, in a cylindrical shape, that can store a stack of, for example, about several tens of media M. In the case 10, the first-stacker storage section 41A is detachably supported to a first stacker base 42A fixed to the case 10. A notch 43A, which is cut so as to be elongated downward, is formed in part of the outer wall of the first-stacker storage section 41A. This notch 43A enables the arm 61 of the transport section 60 to move to the bottom of the first-stacker storage section 41A.

The second stacker 40B has a second-stacker storage section 41B, in a cylindrical shape, that can store a stack of, for example, about several tens of media M. In the case 10, the second-stacker storage section 41B is detachably supported to a second stacker base 42B fixed to the case 10. Specifically, the second-stacker storage section 41B is detachably supported to the second stacker base 42B with a clearance K left between the upper end of the second-stacker storage section 41B and the lower surface of the first stacker base 42A below the first stacker 40A: the arm 61 of the transport section 60 can be inserted into the clearance K. A notch 43B, which is cut so as to be elongated downward, is formed in part of the outer wall of the second-stacker storage section 41B. This notch 43B enables the arm 61 of the transport section 60 to move to the bottom of the second-stacker storage section 41B.

As described above, the transport section 60 is disposed in the upper case 12 as illustrated in FIGS. 2 and 3. The transport section 60 transports the medium M among the first stacker 40A, second stacker 40B, first medium drive 20A, second medium drive 20B, and label printer 30.

In addition to the arm 61, the transport section 60 has a guide 62 that supports the arm 61. The guide 62 is disposed behind the first stacker 40A and second stacker 40B and to the right of the first medium drive 20A, second medium drive 20B, and label printer 30. The guide 62 is formed like an elongated bar and is erected on the upper surface 11A of the partition 11. The arm 61 moves vertically along the axial direction of the guide 62, and is supported by an arm driving section 63 that swings around the shaft of the guide 62. A medium holding section 64 is provided at the end of the arm 61. The medium holding section 64 holds the medium M in such a way that the medium M can be released.

The arm driving section 63 has an arm detection sensor (not illustrated) that detects the vertical position of the arm driving section 63 on the guide 62 and the swing position of the arm driving section 63 around the shaft of the guide 62. A medium-processing-apparatus control section 100, which will be described later, can detect the position of the medium M held by the medium holding section 64, based on the position of the arm driving section 63 on the guide 62, the position being detected by the arm detection sensor.

The upper case 12 has space, in which the transport section 60 vertically transports the medium M, to the left of the first stacker 40A and second stacker 40B and in front of the first medium drive 20A, second medium drive 20B, and label printer 30. A third stacker 50 is provided at the bottom of the space.

As illustrated in FIG. 2, an opening 14 is formed in the front surface 12B of the upper case 12. A door 15 is provided in front of the opening 14. The door 15 is swingably supported by a door shaft 16 provided at the right end 14A of the opening 14. When the media processing apparatus 1 detects that the door 15 for the opening 14 is closed, the first medium drive 20A, second medium drive 20B, label printer 30, and transport section 60 are operable. By contrast, when the media processing apparatus 1 detects that the door 15 for the opening 14 is open, the media processing apparatus 1 stops the operations of the first medium drive 20A, second medium drive 20B, label printer 30, and transport section 60.

As illustrated in FIGS. 2 and 3, the third stacker 50 is disposed in the lower case 13 so as to be able to be pulled out of a pullout opening 17 formed in the front surface 13A of the lower case 13, as a storage section that stores the medium M. The third stacker 50 is structured so that even while the door 15 is closed, the user can pull out the third stacker 50 from the pullout opening 17 and can take the processed medium M out of the media processing apparatus 1. The processed medium M refers to the medium M with data written to the recording surface and with printing terminated on the label surface. That is, even in a state in which the first medium drive 20A, second medium drive 20B, label printer 30, or transport section 60 is operating, the user can pull out the third stacker 50 from the pullout opening 17 and can take the processed medium M out of the media processing apparatus 1.

The third stacker 50 is disposed below the first medium drive 20A, second medium drive 20B, and label printer 30 so as to be aligned with them. The third stacker 50 has a third-stacker storage section 51 that can be pulled out toward the front of the case 10 through the pullout opening 17 formed in the front surface 13A of the lower case 13. The third-stacker storage section 51 has a recess 52, which is substantially circular, in which media M are stacked. Several media M can be stored in the recess 52. A grip 54 is formed on the front surface 53 of the third stacker 50 as illustrated in FIG. 2. The user can hold the grip 54 to pull out the third-stacker storage section 51 from the case 10 toward the front.

The third stacker 50 is structured so that an additional stacker 57 can be attached, as indicated by the dash-dot-dot lines in FIG. 2. The additional stacker 57 is formed in a cylindrical shape having a bottom so that a stack of media M can be stored. When the additional stacker 57 is attached to the third stacker 50, the number of media M that can be stored in the third stacker 50 can be increased from several media M to several tens of media M.

Next, the functional structures of the media processing apparatus 1 and control apparatus 2 will be described.

Figure 4:
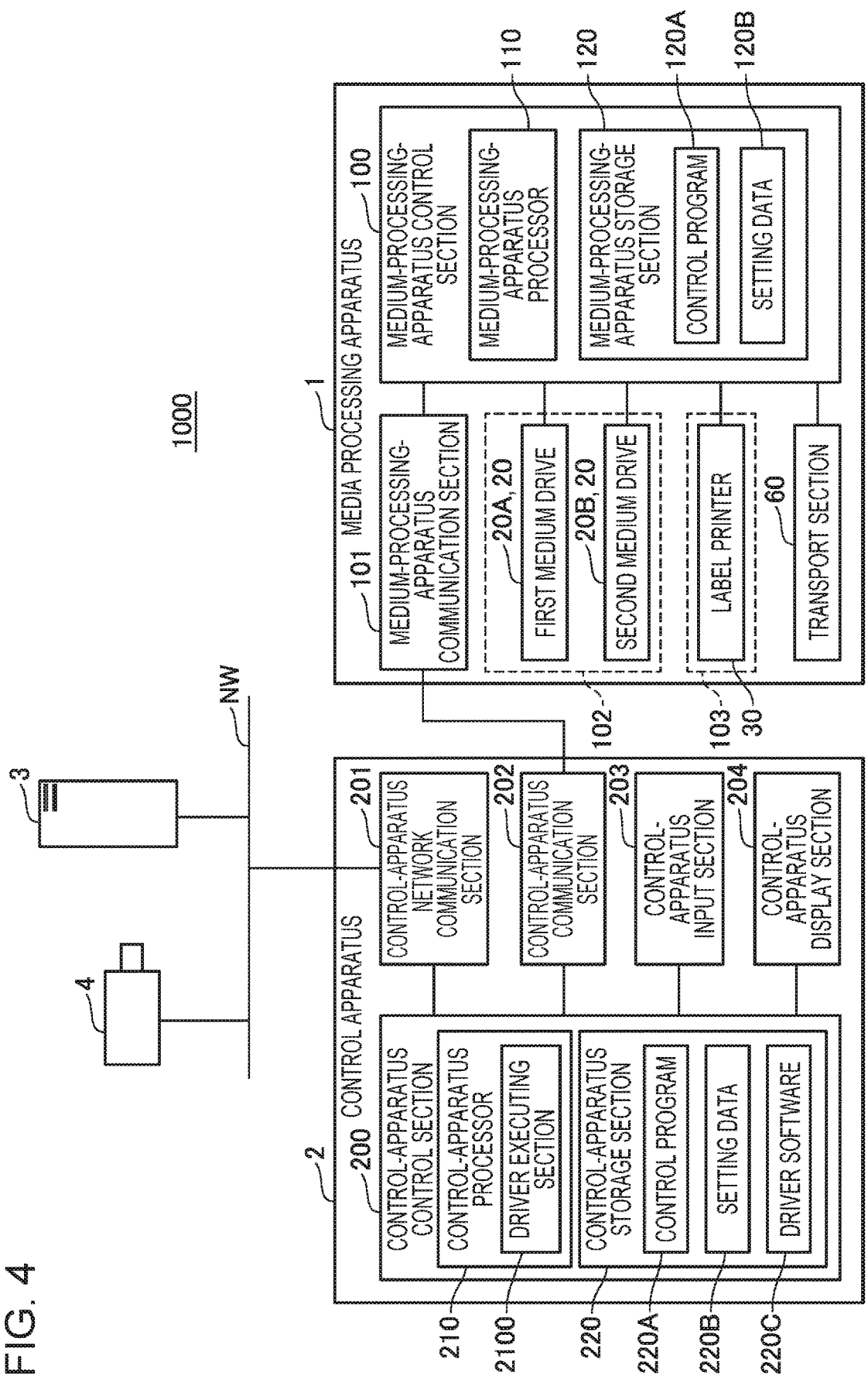
FIG. 4 is a block diagram illustrating the functional structures of the media processing apparatus and a control apparatus.

FIG. 4 is a block diagram illustrating the functional structures of the media processing apparatus 1 and control apparatus 2.

The media processing apparatus 1 has a medium-processing-apparatus control section 100, a medium-processing-apparatus communication section 101, a writing section 102, a printing section 103, and the transport section 60.

The medium-processing-apparatus control section 100 is an example of a control section.

The medium-processing-apparatus control section 100 has a medium-processing-apparatus processor 110, such as a central processing unit (CPU) or microprocessing unit (MPU), that executes programs, as well as a medium-processing-apparatus storage section 120. The medium-processing-apparatus control section 100 controls individual sections in the media processing apparatus 1. The medium-processing-apparatus control section 100 executes various types of processing by cooperation between hardware and software so that the medium-processing-apparatus processor 110 reads out a control program 120A stored in the medium-processing-apparatus storage section 120 and executes processing.

The control program 120A is an example of a program.

The medium-processing-apparatus storage section 120 has a storage area in which programs to be executed by the medium-processing-apparatus processor 110 and data to be processed by the medium-processing-apparatus processor 110 are stored. The medium-processing-apparatus storage section 120 stores the control program 120A to be executed by the medium-processing-apparatus processor 110 and setting data 120B including various settings related to the operation of the media processing apparatus 1. The medium-processing-apparatus storage section 120 has a non-volatile storage area in which programs and data are stored in a non-volatile manner. The medium-processing-apparatus storage section 120 may also include a volatile storage area to have a work area in which programs to be executed by the medium-processing-apparatus processor 110 and data to be processed are temporarily stored.

The medium-processing-apparatus communication section 101 is structured by using communication hardware complying with a predetermined communication standard. The medium-processing-apparatus communication section 101 communicates with the control apparatus 2 under control of the medium-processing-apparatus control section 100. Examples of communication hardware include a communication circuit, communication ports, a communication circuit board, communication connectors, and other hardware. The communication standard used between the medium-processing-apparatus communication section 101 and the control apparatus 2 may be a wired communication standard or may be a wireless communication standard.

The writing section 102 is a functional section that writes data to the recording surface of the medium M. The writing section 102 has the first medium drive 20A and second medium drive 20B. The writing section 102 uses any one of the first medium drive 20A and second medium drive 20B to write data to one medium M under control of the medium-processing-apparatus control section 100.

The printing section 103 is a functional section that prints an image on the label surface of the medium M. The printing section 103 has the label printer 30, an ink supply section that supplies ink to the label printer 30, and other structural elements involved in printing. The printing section 103 prints an image on the label surface of the medium M under control of the medium-processing-apparatus control section 100.

The transport section 60 has the arm 61, the guide 62, the arm driving section 63, the medium holding section 64, a driving section that drives the medium holding section 64, and other structural elements involved in the transport of the medium M. The transport section 60 transports the medium M in the media processing apparatus 1 under control of the medium-processing-apparatus control section 100.

The control apparatus 2 has a control-apparatus control section 200, a control-apparatus network communication section 201, a control-apparatus communication section 202, a control-apparatus input section 203, and a control-apparatus display section 204.

The control-apparatus control section 200 has a control-apparatus processor 210, such as a CPU or an MPU, that executes programs, as well as a control-apparatus storage section 220. The control-apparatus control section 200 controls individual sections in the control apparatus 2. The control-apparatus control section 200 executes various types of processing by cooperation between hardware and software so that the control-apparatus processor 210 reads out a control program 220A, driver software 220C, or the like stored in the control-apparatus storage section 220 and executes processing.

The driver software 220C is installed in the control apparatus 2. When the control-apparatus processor 210 reads out the driver software 220C and executes it, the control-apparatus control section 200 functions as a driver executing section 2100, which will be described later.

The control-apparatus storage section 220 has a storage area in which programs to be executed by the control-apparatus processor 210 and data to be processed by the control-apparatus processor 210 are stored. The control-apparatus storage section 220 stores the control program 220A to be executed by the control-apparatus processor 210, setting data 220B including various settings related to the operation of the control apparatus 2, the driver software 220C, and various other types of data. The control-apparatus storage section 220 has a non-volatile storage area in which programs and data are stored in a non-volatile manner. The control-apparatus storage section 220 may also include a volatile storage area to have a work area in which programs to be executed by the control-apparatus processor 210 and data to be processed are temporarily stored.

The control-apparatus network communication section 201 has communication hardware complying with a predetermined communication standard. Under control of the control-apparatus control section 200, the control-apparatus network communication section 201 communicates with the file storage apparatus 3 connected to the network NW in compliance with the predetermined communication standard.

The control-apparatus communication section 202 has communication hardware complying with the predetermined communication standard. Under control of the control-apparatus control section 200, the control-apparatus communication section 202 communicates with the media processing apparatus 1.

The control-apparatus input section 203 has manipulation switches provided on the control apparatus 2 and input units, such as a keyboard and a touch panel, coupled to the control apparatus 2. The control-apparatus input section 203 detects a manipulation performed on an input unit by the user that manipulates the control apparatus 2, and sends an output to the control-apparatus control section 200. The control-apparatus control section 200 receives the output from the control-apparatus input section 203, and executes processing corresponding to the manipulation on the input unit based on the received output.

The control-apparatus display section 204 has a display panel such as a liquid crystal display panel. The control-apparatus display section 204 displays various types of information under control of the control-apparatus control section 200.

The driver executing section 2100 acquires a photographic data file from the file storage apparatus 3, and sends the acquired photographic data file to the media processing apparatus 1 as write data, which is data to be written to the recoding surface of the medium M.

The driver executing section 2100 acquires a photographic data file of first photographic data, which was output from the camera 4 to the file storage apparatus 3 for the first time after the camera 4 started photography. The driver executing section 2100 then sends the acquired photographic data file and a medium create command to the media processing apparatus 1 through the control-apparatus communication section 202.

The medium create command commands media creation on the medium M in compliance with the command system of the media processing apparatus 1. Upon receipt of the medium create command, the media processing apparatus 1 starts write processing by the medium drive 20.

In this embodiment, the driver executing section 2100 sends the medium create command to the media processing apparatus 1 together with the photographic data file of the first photographic data. However, the driver executing section 2100 may send the medium create command to the media processing apparatus 1 before sending the photographic data file.

The driver executing section 2100 acquires, from the file storage apparatus 3, a photographic data file each time the camera 4 intermittently outputs photographic data to the file storage apparatus 3, starting from the first photographic data, which is output to the file storage apparatus 3 for the first time after the camera 4 started photography. Then, the driver executing section 2100 sends the acquired photographic data file to the media processing apparatus 1 as write data.

When a predetermined trigger occurs, the driver executing section 2100 sends a medium close command to the media processing apparatus 1 through the control-apparatus communication section 202. The medium close command commands close processing by which the medium M is closed so that additional data is not written. The medium close command complies with the command system of the media processing apparatus 1.

When the number of photographic data files sent to the media processing apparatus 1 reaches a predetermined number, the driver executing section 2100 sends the medium close command to the media processing apparatus 1.

When the sum of the amount of data in the photographic data file acquired last from the file storage apparatus 3 and the total amount of data in photographic data files sent to the media processing apparatus 1 until the last acquisition exceeds a predetermined threshold value, the driver executing section 2100 also sends the medium close command to the media processing apparatus 1.

This predetermined threshold value, which is lower than the maximum amount of data that can be written to one medium M, is determined in advance through, for example, a preliminary test or simulation. The predetermined threshold value varies depending on the type of medium M on which the media processing apparatus 1 performs media creation. When the medium M on which the media processing apparatus 1 performs media creation is a CD, the predetermined threshold value is a value indicating, for example, 600 megabytes (MB). When the medium M on which the media processing apparatus 1 performs media creation is a DVD, the predetermined threshold value is a value indicating, for example, 4 gigabytes (GB). When the medium M on which the media processing apparatus 1 performs media creation is a BD, the predetermined threshold value is a value indicating, for example, 23 GB.

When a close file is stored in the file storage apparatus 3 and the driver executing section 2100 acquires the close file from the file storage apparatus 3, the driver executing section 2100 sends a medium close command to the media processing apparatus 1 through the control-apparatus communication section 202. The close file indicates termination of photography by the camera 4. When the camera 4 starts photography, the file storage apparatus 3 creates a folder in which to store photographic data files. Each time the camera 4 outputs photographic data, the file storage apparatus 3 stores a photographic data file in the created folder. When the camera 4 terminates photography, the file storage apparatus 3 stores a close file in the created folder.

Next, the operation of the media processing apparatus 1 will be described.

Figure 5:
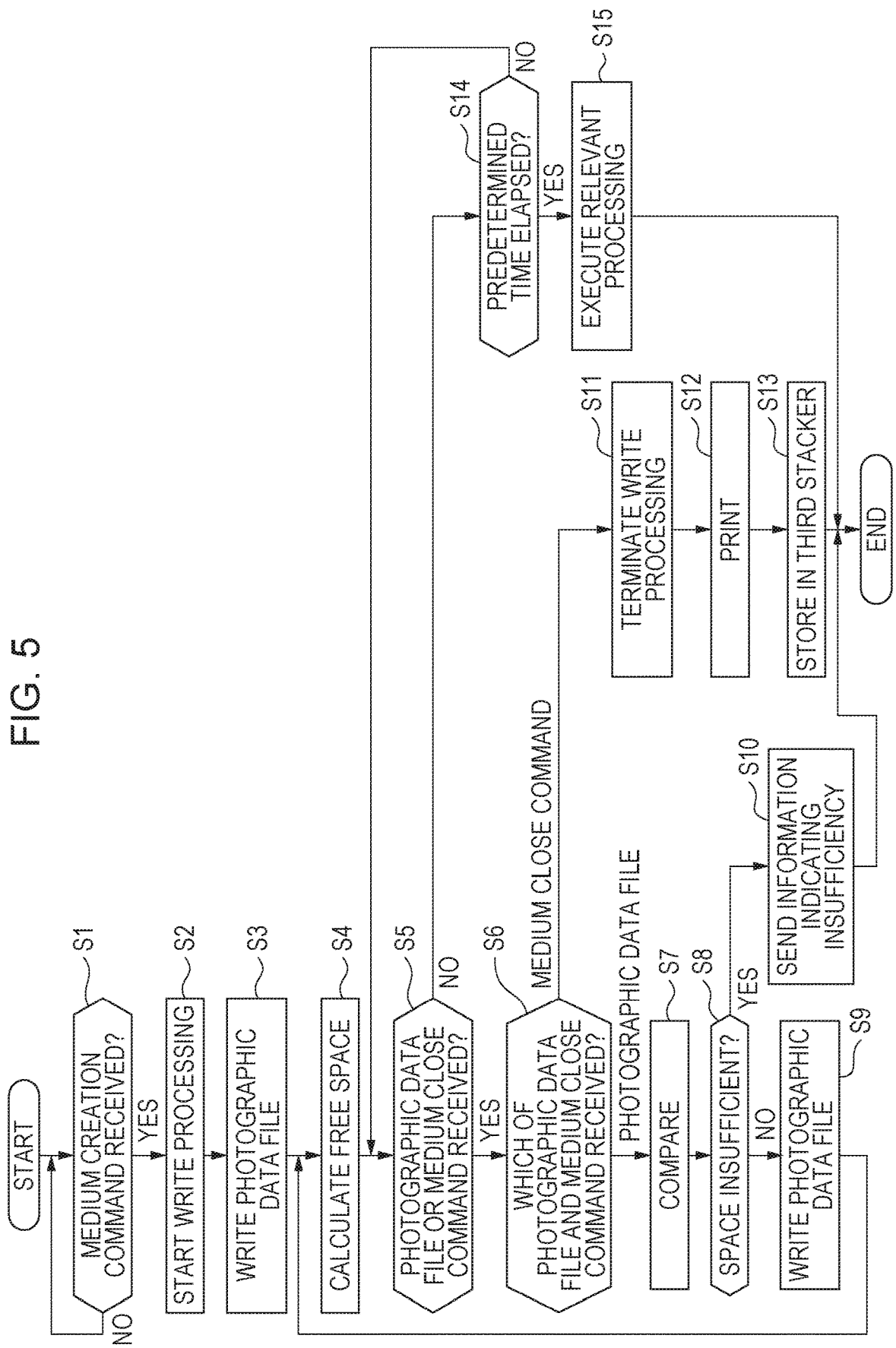
FIG. 5 is a flowchart indicating the operation of the media processing apparatus.

FIG. 5 is a flowchart indicating the operation of the media processing apparatus 1.

The medium-processing-apparatus control section 100 in the media processing apparatus 1 decides whether the medium-processing-apparatus communication section 101 has received a medium create command from the control apparatus 2 (step S1).

When the medium-processing-apparatus control section 100 decides that a medium create command has not been received (No in step S1), the medium-processing-apparatus control section 100 makes a decision again in step S1.

When the medium-processing-apparatus control section 100 decides that a medium create command has been received (Yes in step S1), the medium-processing-apparatus control section 100 starts write processing by the medium drive 20 (step S2). In step S2, the medium-processing-apparatus control section 100 causes the transport section 60 to transport a medium M for which no data is written to the recording surface and printing is not performed on the label surface from the first stacker 40A or second stacker 40B to the medium drive 20.

Next, the medium-processing-apparatus control section 100 starts write processing and then causes the medium drive 20 to write, to the medium M, a first photographic data file received together with the medium create command (step S3). The first photographic data file to be written in step S3 is a file of photographic data that was output from the camera 4 to the file storage apparatus 3 for the first time after the camera 4 started photography.

Next, after the first photographic data file has been written, the medium-processing-apparatus control section 100 calculates a free space in the medium M (step S4). In step S4 executed for the first time, the medium-processing-apparatus control section 100 calculates a free space in the medium M to which one photographic data file has been written. In step S4 executed a second time or later, the medium-processing-apparatus control section 100 calculates a free space in the medium M to which a plurality of photographic data files have been written.

Next, the medium-processing-apparatus control section 100 decides whether the medium-processing-apparatus communication section 101 has received a new second photographic data file or a medium close command has been received from the control apparatus 2 (step S5).

When the medium-processing-apparatus control section 100 decides that a new second photographic data file or a medium close command has been received from the control apparatus 2 (Yes in step S5), the medium-processing-apparatus control section 100 decides which of the new second photographic data file and medium close command has been received from the control apparatus 2 (step S6).

When the medium-processing-apparatus control section 100 decides that a new second photographic data file has been received from the control apparatus 2 (photographic data file in step S6), the medium-processing-apparatus control section 100 makes a comparison between the free space, calculated in step S4), in the medium M, and the amount of data in the received new second photographic data file (step S7).

The medium-processing-apparatus control section 100 decides whether a space to which the received second photographic data file is written is insufficient on the medium M, based on the comparison result in step S7 (step S8).

When the medium-processing-apparatus control section 100 decides that a space to which the received second photographic data file is written is not insufficient in the medium M (No in step S8), the medium-processing-apparatus control section 100 causes the medium drive 20 to write the newly received photographic data file to the medium M (step S9).

After having written the photographic data file in step S9, the medium-processing-apparatus control section 100 returns processing to step S4. The medium-processing-apparatus control section 100 executes processing in step S4 and later. Specifically, each time the medium-processing-apparatus control section 100 receives a new photographic data file, which is a k-th photographic data file (k is an integer equal to or greater than 3), from the control apparatus 2, when the medium M has a free space enough to write the newly received photographic data file, the medium-processing-apparatus control section 100 causes the medium drive 20 to write the newly received photographic data file to the medium M.

When the medium-processing-apparatus control section 100 decides that a space to which the newly received photographic data file is written is insufficient in the medium M (Yes in step S9), the medium-processing-apparatus control section 100 sends the control apparatus 2 information indicating an insufficiency through the medium-processing-apparatus communication section 101 (step S10). Thus, the control apparatus 2 can indicate a message indicating an insufficiency, can send a medium close command, or can execute other processing that has to be performed when the free space in the medium M is insufficient, for example.

Step S6 will be described again. When the medium-processing-apparatus control section 100 decides that a medium close command has been received (medium close command in step S6), the medium-processing-apparatus control section 100 performs close processing on the medium M in response to the received medium close command to terminate write processing by the medium drive 20 (step S11).

Next, the medium-processing-apparatus control section 100 causes the transport section 60 to transport the medium M that has undergone close processing to the label printer 30, and causes the label printer 30 to print an image on the label surface of the medium M (step S12). Image data of the image to be printed on the label surface may be received together with a medium create command or may be received during write processing.

When printing by the label printer 30 is terminated, the medium-processing-apparatus control section 100 causes the transport section 60 to store the processed medium M in the third stacker 50 (step S13).

As described above, upon receipt of a first photographic data file, the medium-processing-apparatus control section 100 causes the medium drive 20 to write the received first photographic data file to the medium M. When the medium-processing-apparatus control section 100 receives a second photographic data file that is sent from the control apparatus 2 after the first photographic data file has been sent, the medium-processing-apparatus control section 100 causes the medium drive 20 to write the received second photographic data file to the medium M. When the medium-processing-apparatus control section 100 receives a medium close command, the medium-processing-apparatus control section 100 terminates write processing by the medium drive 20 and causes the label printer 30 to perform printing on the label surface.

Thus, by responding to the received medium close command, the medium-processing-apparatus control section 100 can terminate writing by the medium drive 20 and can shift to printing on the label surface. Therefore, even when photographic data files are intermittently sent from the control apparatus 2, media creation on the medium M can be performed. Furthermore, each time one photographic data file is received, the medium drive 20 writes the one photographic data file to the medium M. This enables the medium M to be quickly created when compared with when, after a plurality of photographic data files have been received, the plurality of photographic data files are written to the medium M in batch.

The first photographic data file and second photographic data file described above do not refer to two specific different photographic data files. The first photographic data file refers to an arbitrary photographic data file. The second photographic data file refers to a photographic data file sent from the control apparatus 2 after the arbitrary photographic data file has been sent.

Step S5 will be described again. When the medium-processing-apparatus control section 100 decides that neither a new second photographic data file nor a medium close command has been received from the control apparatus 2 (No in step S5), the medium-processing-apparatus control section 100 decides whether a time during which a new data file or a medium close command has not been received from when the previous photographic data file was received exceeds a predetermined time (step S14).

When the medium-processing-apparatus control section 100 decides that a time during which neither a new data file nor a medium close command has been received does not exceed the predetermined time (No in step S14), the medium-processing-apparatus control section 100 returns processing to step S5.

When the medium-processing-apparatus control section 100 decides that a time during which neither a new data file nor a medium close command has been received exceeds the predetermined time (Yes in step S14), the medium-processing-apparatus control section 100 executes relevant processing (step S15).

Here, two pieces of processing will be described as processing in step S15.

First Processing

The medium-processing-apparatus control section 100 sends information to the control apparatus 2 through the medium-processing-apparatus communication section 101 in step S15, the information indicating that neither a new photographic data file nor a medium close command has been received within the predetermined time after the previous photographic data file was received. Thus, the control apparatus 2 can indicate a message indicating that the media processing apparatus 1 has received neither a new photographic data file nor a medium close command, can send a medium close command, or can execute other processing that has to be performed when the media processing apparatus 1 has received neither a new photographic data file nor a medium close command, for example.

Second Processing

The medium-processing-apparatus control section 100 performs close processing on the medium M in step S15 to terminate write processing by the medium drive 20, and prints an image on the label surface of the medium M. This can prevent the media processing apparatus 1 from being stopped due to the inability to shift to printing, and can thereby prevent media creation on the medium M from being stopped. Furthermore, even when the control apparatus 2 does not send a medium close command because a predetermined trigger does not occur, the media processing apparatus 1 can shift to printing processing on the label surface and can complete the media creation on the medium M.

The above embodiment has effects described below. A first photographic data file, a second photographic data file, and a third photographic data file used in the following description of the effects do not refer to specific photographic data files. The first photographic data file refers to an arbitrary photographic data file. The second photographic data file refers to a next photographic data file sent from the control apparatus 2 after the arbitrary photographic data file has been sent. The third photographic data file refers to a photographic data file sent from the control apparatus 2 after the next photographic data file has been sent.

The media processing apparatus 1 has the medium drive 20 and label printer 30, as well as the medium-processing-apparatus control section 100 that controls the medium drive 20 and label printer 30. When the medium-processing-apparatus control section 100 receives the first photographic data file from the control apparatus 2, the medium-processing-apparatus control section 100 causes the medium drive 20 to write the first photographic data file to the medium M. After the medium-processing-apparatus control section 100 has received the first photographic data file, when the medium-processing-apparatus control section 100 receives the second photographic data file, which is sent from the control apparatus 2 after the first photographic data file has been sent, the medium-processing-apparatus control section 100 causes the medium drive 20 to write the second photographic data file to the medium M. After the medium-processing-apparatus control section 100 has received the second photographic data file, when the medium-processing-apparatus control section 100 receives a medium close command from the control apparatus 2, the medium-processing-apparatus control section 100 terminates write processing by the medium drive 20 in response to the received medium close command, and causes the label printer 30 to perform printing on the label surface.

Thus, by responding to the received medium close command, the medium-processing-apparatus control section 100 can terminate write processing by the medium drive 20 and can shift to printing on the label surface. Therefore, even when photographic data files are intermittently sent from the control apparatus 2, media creation on the medium M can be performed. Each time one photographic data file is received, the medium drive 20 writes the one photographic data file to the medium M. This enables the medium M to be quickly created when compared with a case in which after a plurality of photographic data files have been received, the plurality of photographic data files are written to the medium M in batch.

The medium-processing-apparatus control section 100 calculates a free space in the medium M. When the medium-processing-apparatus control section 100 decides, based on the calculated free space, that a space to which the second photographic data file is written is insufficient in the medium M, the medium-processing-apparatus control section 100 sends the control apparatus 2 information indicating an insufficiency.

Thus, the control apparatus 2 can indicate a message indicating an insufficiency, can send a medium close command, or can execute other processing that has to be performed when the free space in the medium M is insufficient, for example.

When a third photographic data file or a medium close command has not been received from the control apparatus 2 within a predetermined time after the second photographic data file was received from the control apparatus 2, the third photographic data file being intended to be sent from the control apparatus 2 after the second photographic data file has been sent, the medium-processing-apparatus control section 100 sends the control apparatus 2 information indicating that neither a third photographic data file nor a medium close command has been received.

Thus, the control apparatus 2 can execute processing that has to be performed when the media processing apparatus 1 has received neither a new photographic data file nor medium close command.

When a third photographic data file or a medium close command has not been received from the control apparatus 2 within a predetermined time after the second photographic data file was received from the control apparatus 2, the third photographic data file being intended to be sent from the control apparatus 2 after the second photographic data file has been sent, or a medium close command has not been received, the medium-processing-apparatus control section 100 causes the label printer 30 to perform printing on the label surface.

Since this can prevent the media processing apparatus 1 from being stopped due to the inability to shift to printing, it is possible to prevent media creation on the medium M from being stopped. Even when the control apparatus 2 does not send a medium close command because a predetermined trigger does not occur, the media processing apparatus 1 can shift processing to printing on the label surface and can complete media creation.

Upon receipt of a medium create command, the medium-processing-apparatus control section 100 starts write processing by the medium drive 20.

Thus, when the medium-processing-apparatus control section 100 receive a medium create command, the medium-processing-apparatus control section 100 can determine a timing at which to start write processing by the medium drive 20. Even when pieces of write data are intermittently sent from the control apparatus 2, therefore, the medium-processing-apparatus control section 100 can determine the piece of write data from which to start writing to the medium M. This enables the media processing apparatus 1 to appropriately start the writing of data to the medium M when pieces of write data are intermittently sent from the control apparatus 2.

In a method for controlling the media processing apparatus 1, when a first photographic data file is received from the control apparatus 2, the medium drive 20 is caused to write the first photographic data file to a medium M. In the method for controlling the media processing apparatus 1, when a second photographic data file is received, the second photographic data file being sent from the control apparatus 2 after the first photographic data file has been sent, the medium drive 20 is caused to write the second photographic data file to the medium M. In the method for controlling the media processing apparatus 1, after the second photographic data file has been received, when a medium close command is received from the control apparatus 2, the writing of data by the medium drive 20 is terminated in response to the received medium close command, and the label printer 30 is caused to perform printing on the label surface.

Thus, effects similar to the effects of the media processing apparatus 1 are obtained.

In the method for controlling the media processing apparatus 1, after the first photographic data file has been written, a free space in the medium M is calculated.

Thus, the media processing apparatus 1 can execute processing based on the free space in the medium M, such as, for example, a comparison between the free space in the medium M and the amount of data in the received photographic data file.

In the method for controlling the media processing apparatus 1, after the second photographic data file has been received from the control apparatus 2, a comparison is made between the free space in the medium M and the amount of data in the second photographic data file.

Thus, when the second photographic data file is to be written to the medium M, the second photographic data file being sent after the first photographic data file has been sent, a decision can be made as to whether the free space in the medium M is insufficient.

When a first photographic data file is received from the control apparatus 2, the control program 120A causes the medium drive 20 to write the received first photographic data file to a medium M. When a second photographic data file is received from the control apparatus 2, the second photographic data file being sent from the control apparatus 2 after the first photographic data file has been sent, the control program 120A causes the medium drive 20 to write the received second photographic data file to the medium M. After the second photographic data file has been received, when a medium close command is received from the control apparatus 2, the control program 120A causes the medium-processing-apparatus control section 100 to terminate writing by the medium drive 20 in response to the received medium close command and causes the label printer 30 to perform printing on the label surface.

Thus, effects similar to the effects of the media processing apparatus 1 are obtained.

The embodiment described above just indicates one aspect of the present disclosure. The embodiment can be arbitrarily modified and applied without departing from the intended scope of the present disclosure.

For example, in the above embodiment, the control apparatus 2 has sent a photographic data file as write data. However, write data to be sent by the control apparatus 2 may not be in a file format. Furthermore, write data to be sent by the control apparatus 2 is not limited to a file of photographic data captured by the camera 4. For example, write data may be a file of other data such as voice data. In this case, the control apparatus 2 acquires a file of other data from the file storage apparatus 3, and the media processing system 1000 has an apparatus that intermittently outputs the file of other data to the file storage apparatus 3.

For example, the media processing apparatus 1 in the above embodiment has had the first medium drive 20A and second medium drive 20B. However, the media processing apparatus 1 may have more apparatuses that write, to the medium M, data similar to data handled by the medium drives 20. Processing on the medium M by each medium drive 20 is not limited to write processing. The medium drive 20 may be an apparatus that can also read out data.

For example, the media processing apparatus 1 in the above embodiment has had one label printer 30. However, the media processing apparatus 1 may have a plurality of label printers 30.

The functions of the medium-processing-apparatus control section 100 and control-apparatus control section 200 may be implemented by a plurality of processors or a semiconductor chip.

The sections illustrated in FIG. 4 are just an example. There is no particular limitation on a specific embodiment. That is, one piece of hardware does not necessarily need to be mounted in correspondence with one section. Of course, one processor may execute programs to implement the functions of individual sections. Part of the functions implemented by software in the above embodiment may be implemented by hardware. Alternatively, part of the functions implemented by hardware may be implemented by software. In addition, specific details of the structures of other sections in the media processing apparatus 1 and control apparatus 2 can also be arbitrarily modified without departing from the intended scope of the present disclosure.

The flowchart in FIG. 5 is divided into operation steps according to, for example, main processing, so as to facilitate the understanding of the operation of each section in the media processing apparatus 1. The present disclosure is not limited by the method for dividing a single piece of processing into steps or by names. The flowchart may be divided into more steps according to the processing. One step may be further divided so as to include more processing. The sequence of steps may be appropriately changed without causing a problem in the intended scope of the present disclosure.

In FIG. 5, the medium-processing-apparatus communication section 101 sends the control apparatus 2 information indicating that a space in the medium M is insufficient in step S10. However, this is not a limitation. For example, when it is confirmed that a space in the medium M is insufficient, the media processing apparatus 1 may execute close processing on the medium M in process. Then, the media processing apparatus 1 may print an image on the label surface and may cause the transport section 60 to store the processed medium M in the third stacker 50.

What is claimed is:

1. A media processing apparatus configured to communicate with a control apparatus that sends first write data and second write data, the media processing apparatus comprising:
   a data writing unit configured to write the first write data and the second write data to a medium;
   a printing unit configured to perform printing on a label surface of the medium; and
   a controller configured to control the data writing unit and the printing unit; wherein the data writing unit write, to the medium, the first write data received from the control apparatus,
after the first write data is received, the second write data is received from the control apparatus,
the data writing unit write the second data to the medium,
when a medium close command that commands close processing on the medium is received from the control apparatus after the second write data is received, write processing by the data writing unit is terminated in response to the medium close command, and
the printing unit perform printing on the label surface.

2. The media processing apparatus according to claim 1, wherein
the controller is configured to
calculate a free space in the medium to which the first write data is written, and
send, when the controller decides based on the calculated free space that a space to which the second write data is written is insufficient in the medium, to the control apparatus, information indicating that the space to which the second write data is written is insufficient in the medium.

3. The media processing apparatus according to claim 1, wherein
when, after the second write data is received from the control apparatus, third write data to be sent from the control apparatus is not received within a predetermined time without the medium close command being received, the controller sends, to the control apparatus, information indicating that the third write data is not received.

4. The media processing apparatus according to claim 1, wherein
when, after the second write data is received from the control apparatus, the medium close command is not received from the control apparatus within a predetermined time, the controller sends, to the control apparatus, information indicating that the medium close command is not received.

5. The media processing apparatus according to claim 1, wherein
when, after the second write data is received from the control apparatus, third write data to be sent from the control apparatus or the medium close command is not received within a predetermined time, the controller terminates the write processing by the data writing unit and causes the printing unit to perform printing on the label surface.

6. The media processing apparatus according to claim 1, wherein
when a medium create command that commands media creation on the medium is received from the control apparatus, the controller starts the write processing by the data writing unit.

7. A method for controlling a media processing apparatus configured to communicate with a control apparatus, the media processing apparatus including a data writing unit that writes first write data and second write data to a medium, the first write data and second write data being received from the control apparatus, and a printing unit that performs printing on a label surface of the medium, the method comprising:
receiving the first write data from the control apparatus;
writing the first write data to the medium by the data writing unit;
receiving the second write data from the control apparatus after the first write data is received;
writing the second data to the medium by the data writing unit; and
after the second write data is received, receiving, from the control apparatus, a medium close command that commands close processing on the medium,
terminating write processing by the data writing unit in response to the received medium close command, and
performing printing on the label surface by the printing unit.

8. The method according to claim 7, further comprising calculating, after the first write data is written, a free space in the medium to which the first write data is written.

9. The method according to claim 7, further comprising calculating, after the second write data is received from the control apparatus, a free space in the medium to which the first write data is written; and
comparing the calculated free space and a data amount of the second write data.

10. The method according to claim 9, further comprising sending, when a space to which the second write data is written is decided to be insufficient in the medium based on the calculated free space, to the control apparatus, information indicating that the space to which the second write data is written is insufficient in the medium.

11. The method according to claim 7, further comprising sending, when after the second write data is received from the control apparatus third write data is not received from the control apparatus within a predetermined time without the medium close command being received, to the control apparatus, information indicating that the third write data is not received.

12. The method according to claim 7, further comprising sending, when the medium close command is not received from the control apparatus within a predetermined time after the second write data is received from the control apparatus, to the control apparatus, information indicating that the medium close command is not received.

13. The method according to claim 7, wherein
when, after the second write data is received from the control apparatus, third write data is not received from the control apparatus within a predetermined time without the medium close command being received, the write processing by the data writing unit is terminated and
the printing unit performs printing on the label surface.

14. The method according to claim 7, wherein
when, after the second write data is received from the control apparatus, the medium close command is not received within a predetermined time, the write processing by the data writing unit is terminated and
the printing unit performs printing on the label surface.

15. The method according to claim 7, further comprising starting, when a medium create command that commands media creation on the medium is received from the control apparatus, the write processing by the data writing unit.

16. A non-transitory computer-readable storage medium storing a program executed by a controller in a media processing apparatus configured to communicate with a control apparatus, the media processing apparatus including a data writing unit that writes first write data and second write data to a medium, the first write data and second write data being received from the control apparatus, and a printing unit that performs printing on a label surface of the medium, the program instructions comprising:

receiving the first write data from the control apparatus and causing the data writing unit to write the first write data to the medium;

receiving the second write data from the control apparatus after the first write data is received and causing the data writing unit to write the second data to the medium; and receiving a medium close command from the control apparatus after the second write data is received, the medium close command commanding close processing on the medium, terminating write processing by the data writing unit in response to the received medium close command, and causing the printing unit to perform printing on the label surface.

17. The non-transitory computer-readable storage medium according to claim 16, the program instructions further comprising calculating, after the first write data is written to the medium, a free space in the medium to which the first write data is written.

18. The non-transitory computer-readable storage medium according to claim 16, the program instructions further comprising calculating, after the second write data is received from the control apparatus, a free space in the medium, and comparing the calculated free space and a data amount of the second write data.

19. The non-transitory computer-readable storage medium according to claim 16, the program instructions further comprising sending, when a space to which the second write data is written is decided to be insufficient in the medium based on the free space, to the control apparatus, information indicating that the space to which the second write data is written is insufficient in the medium.

20. The non-transitory computer-readable storage medium according to claim 16, the program instructions further comprising sending, when the medium close command is not received from the control apparatus within a predetermined time after the second write data is received from the control apparatus, to the control apparatus, information indicating that the medium close command is not received.

* * * * *